(12) United States Patent
No

(10) Patent No.: US 6,587,140 B2
(45) Date of Patent: Jul. 1, 2003

(54) SYSTEM AND METHOD FOR USING A SINGLE INTELLIGENCE CIRCUIT IN BOTH A DIGITAL CAMERA AND PRINTER

(75) Inventor: Young No, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/956,989

(22) Filed: Oct. 23, 1997

(65) Prior Publication Data

US 2002/0196345 A1 Dec. 26, 2002

(51) Int. Cl.$^7$ .............................. H04N 5/225; H04N 5/76
(52) U.S. Cl. ............................ 348/207.2; 348/231.99; 348/333.02
(58) Field of Search ................................ 348/207, 233, 348/232, 231, 333.02, 333.07, 375, 231.99, 231.7, 231.9, 207.2; 358/909.1, 906; 347/186, 195

(56) References Cited

U.S. PATENT DOCUMENTS

| 4,281,909 A | | 8/1981 | Ishibashi et al. |
| 4,803,554 A | | 2/1989 | Pape |
| 4,887,161 A | * | 12/1989 | Watanabe et al. ........... 348/233 |
| 4,914,746 A | | 4/1990 | Nishi et al. |
| 4,937,676 A | * | 6/1990 | Finelli et al. ............... 348/375 |
| 5,231,501 A | | 7/1993 | Sakai |
| 5,488,558 A | * | 1/1996 | Ohki ......................... 701/207 |
| 5,493,332 A | * | 2/1996 | Dalton et al. ............... 348/207 |
| 5,506,617 A | | 4/1996 | Parulski et al. |
| 5,696,850 A | * | 12/1997 | Parulski et al. ............. 348/231 |
| 5,790,193 A | * | 8/1998 | Ohmori ....................... 348/233 |
| 5,796,428 A | * | 8/1998 | Matsumoto et al. ........ 348/231 |
| 6,118,929 A | * | 9/2000 | Kawamura et al. ......... 358/906 |
| 6,145,951 A | * | 11/2000 | Hayasaki et al. ........... 347/195 |
| 6,256,063 B1 | * | 7/2001 | Saito et al. ................. 348/231 |
| 6,295,082 B1 | * | 9/2001 | Dowdy et al. ......... 348/231.99 |

FOREIGN PATENT DOCUMENTS

| EP | 0 382 044 A | 8/1990 |
| EP | 0 675 648 A2 | 10/1995 |

* cited by examiner

Primary Examiner—Aung S. Moe
(74) Attorney, Agent, or Firm—Norman Rushefsky

(57) ABSTRACT

A simplified electronic camera and printer imaging system is provided that includes a single intelligence circuit preferably in the form of a PC card that is detachably connectable to either the camera or the printer for converting a data stream generated by the imaging sensor of the camera into stored data when connected to the camera, and converting the stored data into printer instructions, and relaying the printer instructions to the printhead when connected to the printer. The use of a single intelligence circuit to operate both a digital camera and printer advantageously simplifies the structure of the system, reduces costs, and enhances reliability by minimizing processing steps and circuit interfaces. In the preferred embodiment, the PC card containing the intelligence circuit includes a liquid crystal display and manual controls for displaying stored or real time images, capturing or erasing images, scrolling through stored images, and commanding a printer to render the images in hard copy form.

23 Claims, 3 Drawing Sheets

SYSTEM AND METHOD FOR USING A SINGLE INTELLIGENCE CIRCUIT IN BOTH A DIGITAL CAMERA AND PRINTER

BACKGROUND OF THE INVENTION

This invention generally relates to a system and method for using a single intelligence circuit in both a digital camera and printer, and is specifically concerned with the use of a single PC card to perform the primary data processing operations in both a digital camera and printer to simplify the structure of a camera/printer imaging system.

Techniques for simplifying the structure of components used in digital imaging systems to reduce manufacturing costs are known in the prior art. For example, in the camera system disclosed in U.S. Pat. No. 5,506,617, and assigned to the Eastman Kodak Company, a digital camera is provided as a module that attaches to the signal bus of a PC compatible computer. This system advantageously eliminates the need for a separate intelligence circuit to be incorporated within the camera itself, as the camera in this system includes a PC-compatible interface connector for mating with a bus extension connector on the computer. Digitized data is directly transmitted from the camera to the signal bus of the computer so that the intelligence circuits of the computer can be used to perform all image processing, storage, and display functions. The elimination of the camera intelligence circuit not only simplifies the circuit architecture, but substantially reduces camera manufacturing costs as the microprocessor used in such circuits costs between $20.00 and $40.00 depending upon the speed and operating abilities required.

While the camera-computer system disclosed in the '617 patent represents a significant advance in the simplification of digital camera circuitry, its utility is limited since the digital camera must be continuously connected to the PC compatible computer during both the capturing and displaying of images.

Clearly, there is a need for a completely portable, untethered digital camera that is fully capable of recording images without its own dedicated and relatively expensive microprocessor. Ideally, such a camera could be used in conjunction with a relatively inexpensive thermal or ink-jet printer to produce hard copies of images in photographic form. Finally, it would be desirable if the circuit-simplifying design of the digital camera also allowed the circuitry of the printer to be similarly simplified so that even larger reductions in manufacturing costs could be realized.

SUMMARY OF THE INVENTION

Generally speaking, the invention is an electronic imaging system that utilizes a shared intelligence circuit to fulfill all of the aforementioned criteria. The system of the invention comprises first and second imaging components for capturing and rendering an image, respectively, each of which requires a primary intelligence circuit for operation, and an intelligence circuit that is detachably connectable to either of the imaging components during their operation. The system may, for example, comprise a camera having an imaging sensor for generating a stream of data representative of an image, a printer having a printhead for generating an image from a set of printer instructions, and a single intelligence circuit in the form of a PC card that is detachably connectable to either the camera or the printer for the operation of either. In the method of the invention, the intelligence circuit is first detachably connected to an image capturing component, which may be a camera, in order to convert data stream from an imaging sensor into stored image data. Next, the intelligence circuit is manually removed from the image capturing component, and detachably connected to the image rendering component, which may be a printer. The image rendering component in turn renders an image in accordance with instructions relayed from the intelligence circuit that are generated from the stored image data.

The use of a single intelligence circuit to operate both a camera and a printer of an imaging system advantageously simplifies the system by obviating the need for separate and largely redundant intelligence circuits presently used in both the camera and the printer, thereby reducing manufacturing costs. The use of a single intelligence circuit also enhances the overall reliability of the imaging system by reducing processing steps and component interfaces.

In the preferred embodiment, the intelligence circuit is a PC card having a liquid crystal display for displaying either a real-time or a stored image constructed from instructions generated by the microprocessor of the circuit. The PC card preferably includes manually operated controls for capturing, storing, erasing, and scrolling through images generated by the imaging sensor of the camera.

In one embodiment of the system, the intelligence circuit within the PC card not only stores data from the imaging sensor of the camera, but further includes stored camera and printer-model operating programs for both the camera and the printer that are specific to the particular model and make of the camera and printer. In an alternative embodiment, both the camera and the printer include their own individual stored operating programs in the form of EPROMs. The second embodiment of the system has the advantage of allowing the intelligence circuit to be more versatile, as it can be used in conjunction with a variety of different models of cameras and printers having different features and operational capacities, i.e., zoom lens capabilities, picture editing features, etc.

DETAILED DESCRIPTION OF THE INVENTION

Figure 1:
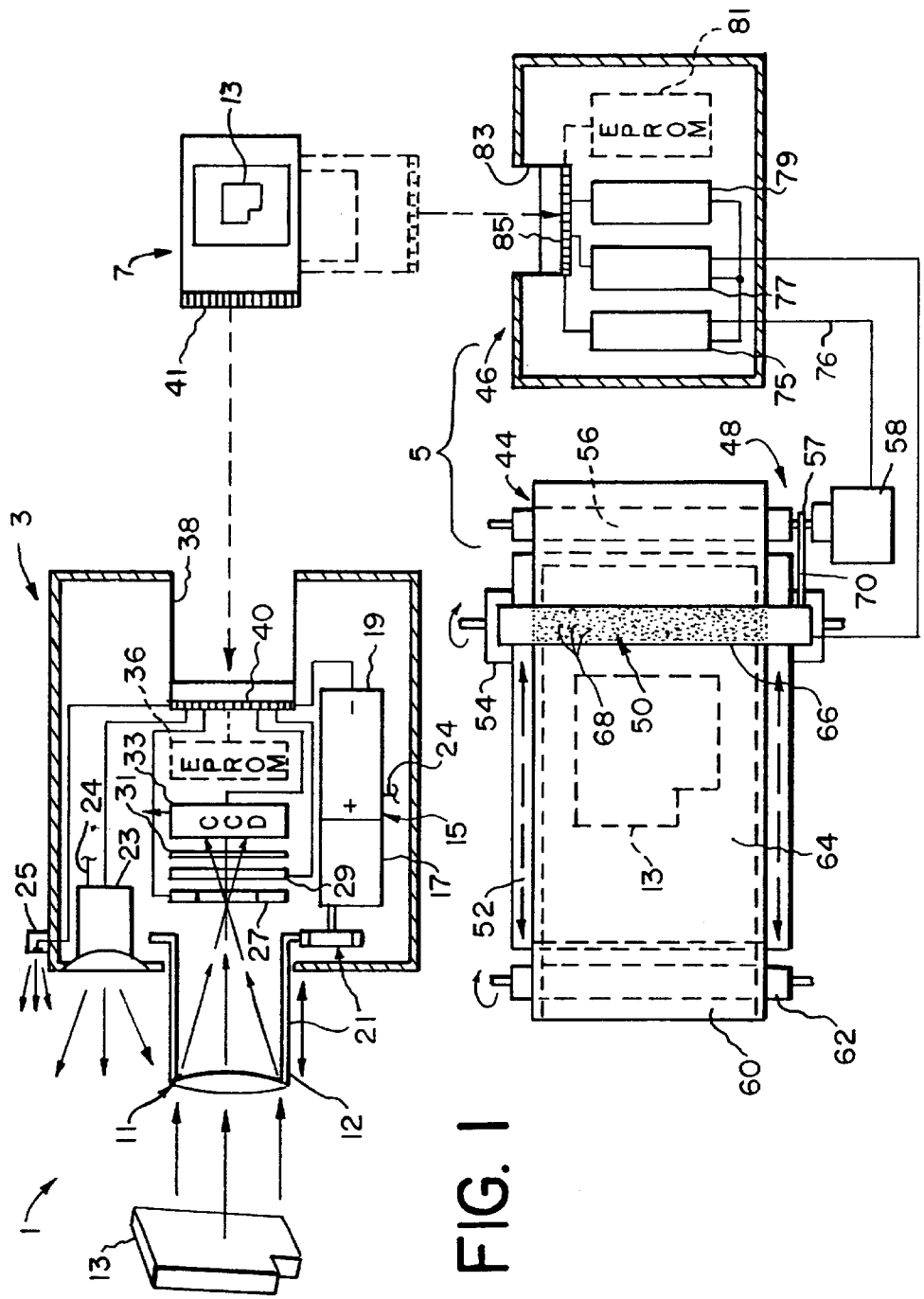
FIG. 1 is a schematic diagram of the electronic imaging system of the invention, illustrating how a single, portable intelligence circuit is used to operate either a digital camera or a printer.

With reference now to FIG. 1, wherein like numerals designate like components throughout all the several figures, the imaging system 1 of the invention may comprise a digital camera 3, a printer 5, and a shared PC intelligence card 7 which is detachably connectable to either the camera 3 or the printer 5.

The digital camera 3 includes a lens unit 11 disposed within a movable tubular housing 12 for gathering reflected light from a subject 13 to be photographed. A lens focusing assembly 15 which includes a small DC motor 17, battery pack 19 and gear train 21 is provided for reciprocally moving the tubular housing 12 of the lens unit 11 in a manner well known in the art.

Digital camera 3 further includes a flash unit 23 which is likewise powered by the battery pack 19 via connector wire 24, and a photometer 25 for measuring the amount of ambient light in the vicinity of the subject 13. Disposed behind the lens unit 11 are an electronic iris diaphragm 27, electronic shutter 29, infrared filter 31, and imaging unit 33, which may be a charged coupled device (CCD) sensor, such as KAF-400 full frame sensor manufactured by the Eastman Kodak Company located in Rochester, N.Y. While not shown in FIG. 1, components 27,29 and 33 are each connected to and driven by the battery pack 19. In operation, light from a subject 13 is focused onto the surface of the imaging unit from the lens unit 11. The imaging unit includes a 640×480 pixel matrix of individual light sensitive elements which collectively generate a data stream representative of the subject 13.

The digital camera 3 may optionally have any erasable programmable read-only memory (EPROM) 36 which contains an operating program that coordinates the functions of the lens-focusing assembly 15, the flash unit 23, the electronic diaphragm 27 and shutter 29, as well as the activation of the imaging unit 33 whenever the shutter 29 is activated. Finally, the camera 3 includes both a card-receiving slot 38 for receiving the flat, rectangular body of the PC card, as well as a terminal 40 for engaging a row of input and output contacts 41 disposed along an edge of the card 7. In the preferred embodiment, the digital camera 3 may have a structure that is essentially identical to that of the Model DC110 or 220 digital camera manufactured by the previously-mentioned Eastman Kodak Company, the only differences being the replacement of the primary microprocessor and associated programming and memory circuits with the aforementioned card-receiving slot 38 and terminal 40.

In this example, the printer 5 comprises a thermal printing unit 44 connected to control and power circuitry 46, although ink-jet and other types of printers may be used as well. The printing unit 44 is formed from a ribbon advancing assembly 48 and a printhead mechanism 50, both of which cooperate to thermally render an image onto a sheet of thermal printing paper 52. A movable platen roller 54 supports the printing paper 52 as the printhead mechanism 50 sweeps over it to render an image thereon.

The ribbon-advancing assembly 48 includes a drive roller 56 connected to the shaft 57 of an electric motor 58 for unwinding a strip of thermal print ribbon 60 from an opposing spool roller 62. The thermal print ribbon 60 is formed from serially connected portions 64 containing cyan, yellow, and magenta coloring agents, respectively. Thermal printing unit 44 further includes a thermal printhead 66 having a linear row of closely spaced heating elements 68 for depositing coloring agents from the thermal print ribbon 60 onto the thermal printing paper 52 by fusion. A paper moving mechanism 70 is provided for moving the thermal printing paper 52 across the thermal matrix printhead 66 while a selected pattern of the heating elements 68 are actuated in order to deposit an image-forming pattern of coloring agents onto the paper 52. Like the drive roller 56 of the ribbon advancing assembly 48, the paper moving mechanism 70 is mechanically powered by the output shaft 57 of the electric motor 58.

The control and power circuitry 46 of the printer 5 includes a printhead driver and ribbon advance circuit 75 whose output is connected to the electric motor 58 via cable 76. Circuitry 46 also has a printhead controller circuit 77 electrically connected to the heating elements 68 of the thermal matrix printhead 66 via a cable 78. Finally, circuitry 46 includes a power supply 79 which is connected in parallel to the outputs of the circuits 75 and 77. Essentially, the circuits 75 and 77 are power switching circuits formed from an array of power semiconductors whose outputs are modulated by the low-current printer instructions generated by the PC card. In addition to the circuits 75, 77, and 79, the control and power circuitry 46 may further include a EPROM 81 containing an operating program which coordinates the movement of the drive roller 56, paper moving mechanism 70, and the actuation of the heating elements 68. The inclusion of the optional EPROMs 36 to the camera 3 and 81 to the printer 5 advantageously allows the intelligence circuit within the PC card 7 to operate a variety of different imaging systems formed from cameras and printers having different features and capabilities, such as zoom lensing, various picture editing abilities, etc. Finally, similar to the digital camera 3, the printer 5 likewise includes a card-receiving slot 83 for receiving the body of the PC card 7 along with a terminal 85 for engaging the input and output contacts 41 present along an edge of the card 7. The overall structure of the printer 5 may be the same as a Model No. DS 8650 thermal printer manufactured by the Eastman Kodak Company with slot 83 and terminal 85 replacing its microprocessor and associated circuits. Alternatively, a Kodak Model No. HP890C ink jet printer may be used that has been modified in the same manner.

Figure 2:
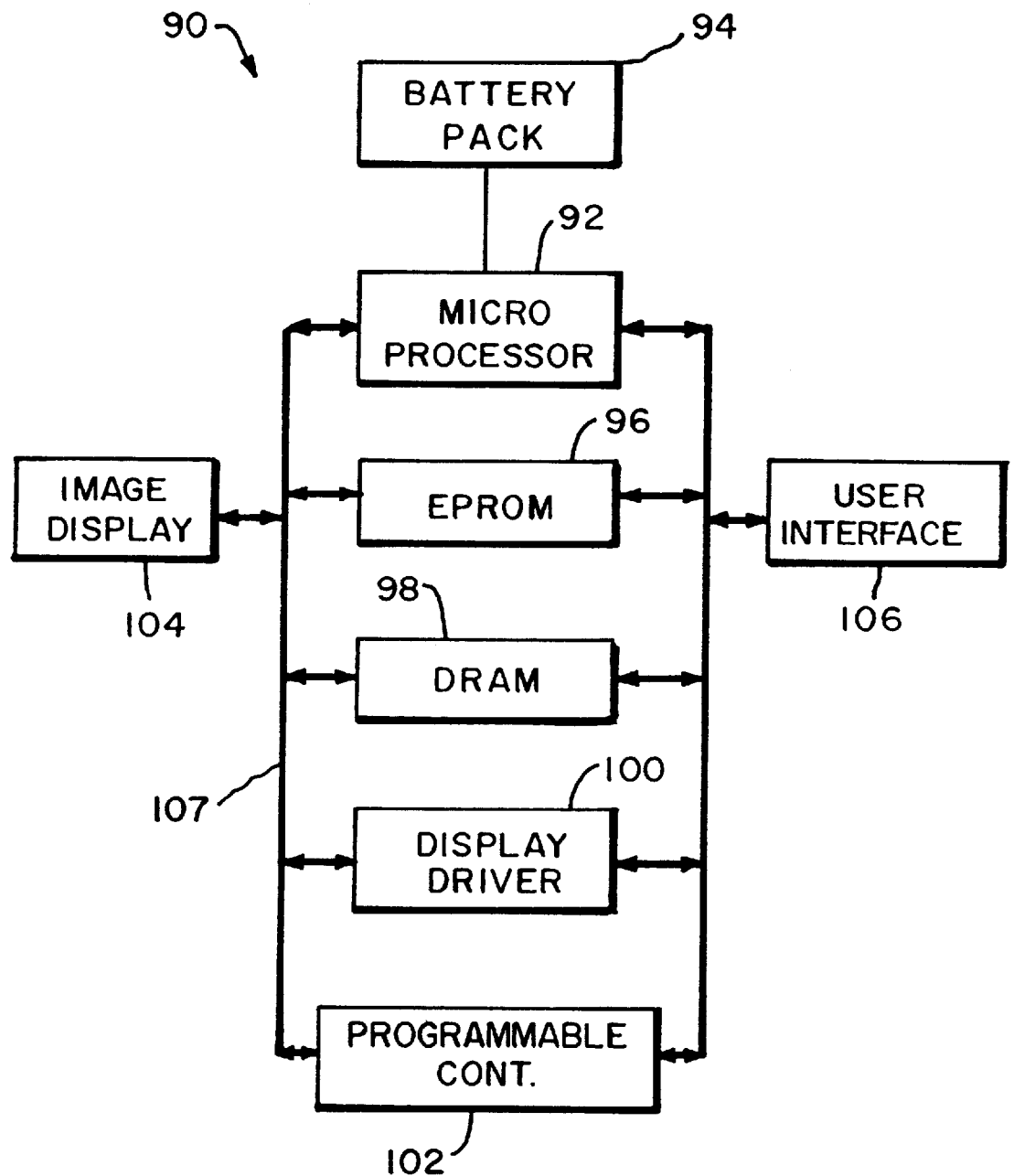
FIG. 2 is a schematic block diagram of the intelligence circuit of the system.

With reference now to FIG. 2, the intelligence circuit 90 disposed within the card 7 includes a microprocessor 92, and a button-type battery pack 94. Preferably, microprocessor 92 is one of the commercially available family of reduced instruction set computers (known in the art as RISC-type processors) that are relatively fast, math intensive, and application-specific. Examples of such processors include the Model 821 Power PC manufactured by Motorola Corporation located in Phoenix, Ariz., and the Model MIPSR-4000 Processor manufactured by NEC Electronics located in Tokyo, Japan. Such processors are fully capable of rapidly implementing the JPEG still image compression algorithm used to control digital cameras such as the previously-mentioned Model DC110 and 220.

The intelligence circuit 90 also includes an EPROM 96 for storing an operating program for the microprocessor 92 that allows it to convert the data stream received from the imaging unit 33 into printer instructions. Any one of a number of commercially available EPROM integrated circuits may be used for the EPROM 96 which preferably have a capacity of about 1 megabyte. In order to store the data generated by the imaging unit 33 of the camera 3, the intelligence circuit further has a dynamic random access memory or DRAM 98 that is powered by the battery pack 94. As the imaging sensor 33 preferably has a capacity of 640×480 pixels, the DRAM 98 should have a 20 megabyte capacity in order to store data for 20, one mega-pixel images or 100 compressed images. Examples of commercially available integrated circuits which can be used as the DRAM 98 include the Model MCM51LXXX DRAM manufactured by Motorola, or one of the series of AMD 29C600 DRAMs manufactured by Advance Micro Devices located in Beaverton, Oreg. In both cases, a total of three, 8 megabyte ICs may be used. Optionally, a flash RAM nonvolatile memory may be substituted for the DRAM 98, the advantage being that no button-type battery pack 94 would be necessary to preserve data captured in the memory of the intelligence circuit 90.

The intelligence circuit 90 further includes both a display driver circuit 100 for providing instructions to a liquid crystal image display 104, and a mechanical programmable controller 102 for providing operational commands to the mechanical systems of the digital camera 3 and the printer 5, i.e., the lens focusing assembly 15, and the printhead driver and ribbon advance circuit 75. Driver circuit 100 is normally part of the liquid crystal display module that forms the image display 104, while mechanical programmable controller 102 may be an application specific integrated circuit (ASIC) manufactured by the Eastman Kodak Company in accordance with known technology.

The intelligence circuit 90 includes a user interface circuit 106 that includes the manual controls and indicator LEDs present on the body of the card 7. All of the components 92, 96, 98, 100, 102, 104, and 106 are interconnected via an address data and input/output bus 107 as is schematically indicated, and with the exception of DRAM 98, all of these components are powered by the battery pack 18 of the camera 3 or power supply 79 of the printer 5.

Figure 3:
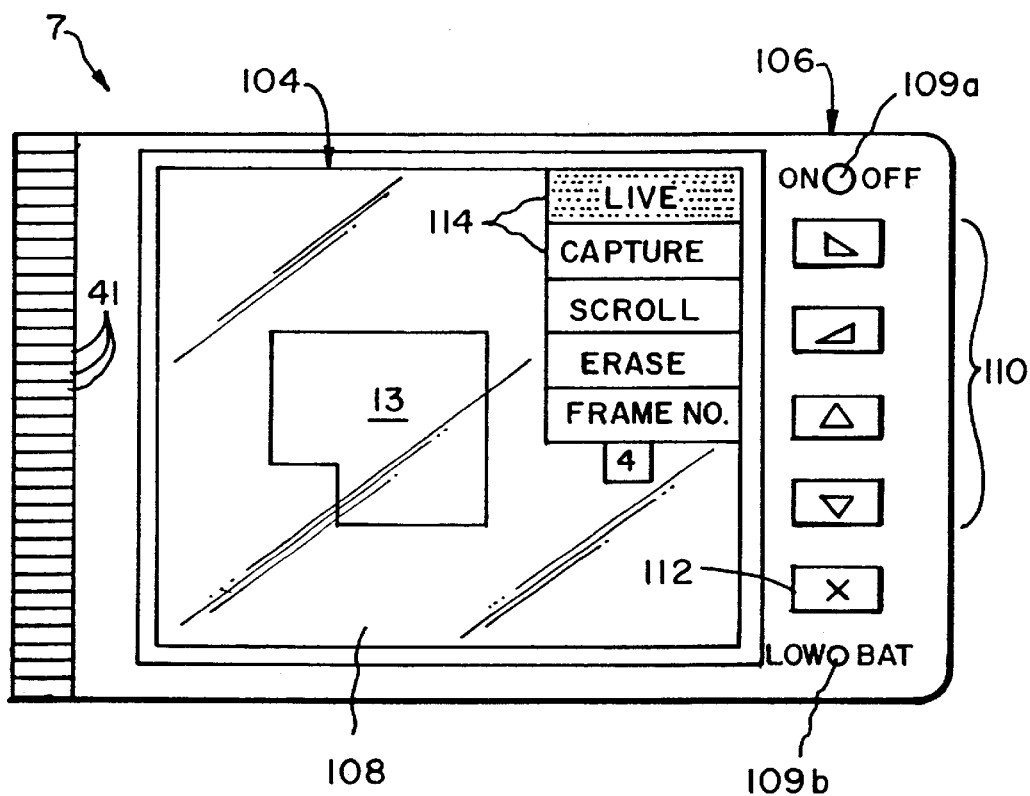
FIG. 3 is a plan view of the PC card that houses the intelligence circuit of FIG. 2, illustrating the liquid crystal display and manual controls of the card.

With reference now to FIG. 3, the card 7 includes a liquid crystal display (LCD) screen 108. In the preferred embodiment, LCD screen is a low temperature, polysilicon-type screen, as such screens can be made with an overall thickness of approximately 1 millimeter and therefore not significantly contribute to the overall thickness of the body of the card 7. The user interface 106 includes two light emitting diode (LED) indicators 109a and 109b for indicating whether or not either the camera or the printer is on or off, and further whether or not the button-type battery in battery pack 94 is running low, thereby jeopardizing the integrity of the images stored in DRAM 98. Interface 106 further includes four manually operated arrow buttons 110 which may be used interactively with a control display 114 which appears in a corner of the LCD 108 when the card 7 is in operation. Finally, interface 106 includes an execute button 112 for executing a selected function in the display 114.

In the example of the control display 114 illustrated in FIG. 3, the system operator has inserted the card 7 into the camera 3 and has further selected the "live picture" function at the top of the display 114 by manipulating bottom-most arrow buttons 110. In such a mode, the LCD 108 acts as a view finder for the system operator, displaying the still frame that will be stored within the DRAM 98 upon the actuation of the electronic shutter 29 of the camera 3. If the system operator wishes to use the card 7 to capture a selected image, he depresses the bottom-most arrow button 110 to light up the "capture" title in the display, and then depresses execute button 112. The number of image frames remaining in the DRAM 98 is displayed in the "frame number" box of the display 114. If the operator wishes to display the frames already stored within the DRAM 98, then he again pushes the bottom-most arrow button 110 to light up the "scroll" box of the display 114, whereupon captured images in the DRAM 98 may be serially scrolled through by manipulating the sideways arrow buttons 110. Of course, a different control display 114 would be exhibited when the card 7 was inserted into the receiving slot 83 of the printer 5. It should be noted that the previously described control scheme on the card 7 has the ergonomic advantage of teaching a first-time user how to operate the printer 5 as the user first learns how to operate the camera 3, since the display, scrolling, and erase functions for both the camera and printer are executed in the same way.

Although the imaging system of the invention has been described with respect to a specific example, variations, additions, and modifications of this system will become evident to those of skill in the art. For example, while the imaging system has been described in terms of a camera and a printer, the system may be used with any other kind of imaging rendering device, such as an electronic photo-album, a PC video screen, a scanner, a transfer station, or an archive station. The camera may be still or video. While the intelligence circuit of the invention has been described in terms of a PC card, this circuit can assume the form of any portable module that is detachably connectable to both a digital camera or printer. Additionally, the intelligence circuit may perform all, most, or some of the intelligence functions of either the camera or the printer. As has been previously pointed out, the presence of an EPROM having a basic operational program in both the camera and the printer allows the card or other modular intelligence to be used in a number of different types of digital cameras and printers having different functions, i.e., zoom lens capacities, special print-editing functions, etc. All such variations, modifications, and additions are intended to be encompassed within the scope of this invention, which is limited only by the claims appended hereto.

| PARTS LIST | |
|---|---|
| 1. | System of the invention |
| 3. | Digital camera |
| 5. | Printer |
| 7. | Shared PC intelligence card |
| 11. | Lens unit |
| 12. | Tubular housing |
| 15. | Lens focusing assembly |
| 17. | Motor |
| 19. | Battery |
| 21. | Gear train |
| 23. | Flash unit |
| 24. | Connector wire |
| 25. | Photometer |
| 27. | Iris diaphragm |
| 29. | Electronic shutter |
| 31. | Infrared filter |
| 33. | Imaging unit |
| 36. | EPROM |
| 38. | Card-receiving slot |
| 40. | Terminal |
| 41. | Output contacts |
| 44. | Thermal printing unit |
| 46. | Control and power circuitry |
| 48. | Ribbon advancing assembly |
| 50. | Printhead mechanism |
| 52. | Thermal printing paper |
| 54. | Platen roller |
| 56. | Drive roller |
| 57. | Shaft |
| 58. | Electric motor |
| 60. | Thermal print ribbon |
| 62. | Spool roller |
| 64. | C-Y-M portion |
| 66. | Thermal matrix printhead |
| 68. | Heating elements |
| 70. | Paper moving mechanism |
| 75. | Printhead driver and ribbon advance |
| 76. | Control cable |
| 77. | Printhead controller |
| 78. | Control cable |
| 79. | Power supply |
| 81. | EPROM |
| 83. | Card-receiving slot |
| 85. | Terminal |
| 90. | Intelligence circuit |
| 92. | Microprocessor |
| 94. | Battery pack |
| 96. | EPROM |
| 98. | DRAM |
| 100. | Display driver |
| 102. | Mechanical driver |
| 104. | Image Display |
| 106. | User interface |
| 107. | Address data and input/output bus |
| 108. | LCD screen |

-continued

PARTS LIST

| 109. | LED indicator |
| 110. | Function controls |
| 112. | Execute button |
| 114. | Control display |

What is claimed is:

1. An intelligence card with a display for use with a digital camera, the camera including an imaging sensor for generating a stream of data representative of an image and a first memory for storing programmed instructions, and for use with a printer, the printer including a second memory for storing programmed instructions, comprising:

an intelligence circuit including a microprocessor and a third memory, the intelligence circuit comprising a module and being detachably directly connectable as a module to both the camera for converting said data stream into stored data on the third memory, and to the printer for generating printer instructions from said stored data to print said image, the intelligence circuit including the display and a display interface and the intelligence circuit being adapted when connected as a module directly to the camera to have the display interface cooperate with the first memory to provide functionality to the display as a camera view finder for use by a camera operator and being adapted when the intelligence circuit is detached from the camera and connected as a module directly to the printer to have the display interface cooperate with the second memory to provide a different functionality to the display that is consistent with the printer and the microprocessor being adapted when connected to the camera to support camera operations as the only microprocessor controlling the camera and the microprocessor being further adapted when connected to the printer to support printer operations as the only microprocessor controlling the printer.

2. An electronic imaging system comprising:
a camera having an imaging sensor for generating a stream of data representative of an image, the camera having a first memory that includes programmed instructions;
a printer having a printhead for generating an image from a set of printer instructions, the printer having a second memory that includes programmed instructions; and
a single intelligence circuit, including a microprocessor, in the form of a removable module that is detachably connectable directly to said camera and said printer so that one or the other but not both is attached and connected to the intelligence circuit for converting said data stream from said imaging sensor into printer instructions, and transmitting said instructions to said printhead, the intelligence circuit including a display and a display interface and when the intelligence circuit is connected to the camera the display interface cooperates with the first memory to provide functionality as a camera view finder for use by a camera operator and when the intelligence circuit is connected to the printer the display interface cooperates with the second memory to provide a different functionality that is consistent with the printer and wherein when the intelligence circuit is connected to the camera the microprocessor comprises the only microprocessor operating the camera and when the intelligence circuit is connected to the printer the microprocessor comprises the only microprocessor operating the printer.

3. The electronic imaging system of claim 2, wherein said intelligence circuit includes a PC card that is mechanically and electrically connectable to and removable from either said camera or said printer.

4. The electronic imaging system of claim 2, wherein said printer includes a printhead driver circuit for controlling mechanical movement of said printhead relative to an image recording medium in response to printer instructions transmitted by said intelligence circuit.

5. The electronic imaging system of claim 2, wherein said printer includes a printhead controller circuit for controlling the amount of a coloring agent deposited onto an image recording medium by said printhead in response to printer instructions transmitted by said intelligence circuit.

6. The electronic imaging system of claim 5, wherein said printer includes a power supply that is modulated by a printhead driver circuit for providing electrical power to an electric motor for moving said printhead.

7. The electronic imaging system of claim 6, wherein said printer includes a power supply that is modulated by said printhead controller circuit for providing electrical power to elements in the printhead that deposit coloring agents on an image recording medium.

8. The electronic imaging system of claim 2, wherein the second memory stores a program that controls the operational coordination of components comprising the printer.

9. The electronic imaging system of claim 2, wherein the camera includes a power source, and the first memory stores a program that controls the operational coordination of components comprising the camera.

10. The electronic imaging system of claim 9, wherein said program stored in the first memory coordinates the operation of a lens focusing assembly, a flash unit, an iris diaphragm for controlling the amount of light admitted to the imaging sensor from a lens, and an electronic shutter in said camera.

11. An electronic imaging system comprising,
a camera having an imaging sensor for generating a stream of data representative of an image;
a printer having a printhead for generating an image from a set of printer instructions, and
a modular intelligence circuit detachably connectable to said camera and said printer so that one or the other but not both is attached and connected to the intelligence circuit for converting said data stream from said imaging sensor into printer instructions, and relaying said instructions to said printhead and wherein the intelligence circuit includes a microprocessor and the microprocessor is the only microprocessor that performs the intelligence functions of the camera when connected to the camera and the microprocessor is the only microprocessor that performs the intelligence functions of the printer when attached to the printer, and wherein said modular intelligence circuit includes a PC card having a display for displaying an image constructed from printer instructions generated by said intelligence circuit.

12. The electronic imaging system of claim 11, wherein said PC card includes a manually operated control for capturing and storing a displayed image.

13. The electronic imaging system of claim 12, wherein said PC card includes a manually operated control for scrolling through a plurality of captured images.

14. The electronic imaging system of claim 12, wherein said PC card includes a manually operated control for erasing a selected stored image.

15. The electronic imaging system of claim 11, wherein said printer includes an electric motor for moving said printhead relative to an image recording medium, and a printhead driver circuit for controlling the operation of said motor to control the movement of said printhead.

16. The electronic imaging system of claim 15, wherein said printhead includes elements for depositing coloring agents onto said medium, and a printhead controller circuit for controlling the operation of said elements.

17. A method for generating an image by means of a camera having an imaging sensor for generating a stream of data representative of an image and a first memory for storing programmed instructions, a printer for rendering an image in accordance with a set of printer instructions, the printer including a second memory for storing programmed instructions, and an intelligence circuit comprising a module having a central processing unit, a display and a third memory, the method comprising the steps of:

connecting said intelligence circuit directly to said camera by attaching said intelligence circuit directly to said camera to convert said stream of data from said imaging sensor into a set of stored data using said programmed instructions stored in said first memory, said intelligence circuit including a microprocessor and said microprocessor being the only microprocessor that performs the intelligence functions of the camera when the intelligence circuit is connected to the camera and the display of the intelligence circuit operating as a view finder for a camera operator to capture an image when the intelligence circuit is connected to the camera;

disconnecting said intelligence circuit from attachment with said camera, and connecting said intelligence circuit directly to said printer by attaching said intelligence circuit directly to said printer to convert said set of stored data into printer instructions and to relay said printer instructions to said printer to render an image in accordance with said printer instructions and in accordance with programmed instructions stored in said second memory, wherein when the intelligence circuit is connected to said printer the microprocessor is the only microprocessor that performs the intelligence functions of the printer and the display of the intelligence circuit operates when attached to said printer to permit a printer operator to scroll through images representative of said stored data.

18. The method for generating an image as defined in claim 17, wherein said intelligence circuit is both electrically and mechanically disconnected from said camera after converting said data stream into stored printer instructions.

19. The method for generating an image as defined in claim 18, wherein said intelligence circuit is both electrically and mechanically connected to said printer after being disconnected from said camera.

20. An electronic imaging system, comprising:

first and second imaging system components each of which requires a primary intelligence circuit for operation, each of said imaging system components including a respective memory associated therewith and storing information relative to operation of a display, and an intelligence circuit in the form of a module and having a central processing unit, the intelligence circuit being detachably and directly connectable to each of said system components for providing the required primary intelligence circuit and comprising the only central processing unit controlling operation of said system component, the intelligence circuit including the display and a display interface and when the intelligence circuit is connected to the first imaging system component the display interface cooperates with the respective memory associated with the first imaging system component to provide a functionality consistent with the first imaging system component and when the intelligence circuit is connected to the second imaging system component the display interface cooperates with the respective memory associated with the second imaging system component to provide a functionality consistent with the second imaging system component.

21. The imaging system of claim 20 and wherein the first imaging system component is a digital camera and the display cooperates when attached to the camera to comprise a view finder for a camera operator.

22. The imaging system of claim 21 and wherein the second imaging system component comprises a printer.

23. The imaging system of claim 21 and wherein the second imaging system component comprises a photo-album.

* * * * *